United States Patent
Scholzen et al.

(10) Patent No.: US 11,016,480 B2
(45) Date of Patent: May 25, 2021

(54) METHOD FOR COMPUTER-ASSISTED FORECASTING OF FUTURE OPERATING STATES OF MACHINE COMPONENTS

(71) Applicant: Walther Flender GmbH, Dusseldorf (DE)

(72) Inventors: Andreas Scholzen, Moers (DE); Simon-Martin Schmidt, Dusseldorf (DE)

(73) Assignee: Walther Flender GmbH, Duesseldorf (DE)

( * ) Notice: Subject to any disclaimer, the term of this patent is extended or adjusted under 35 U.S.C. 154(b) by 312 days.

(21) Appl. No.: 15/756,780

(22) PCT Filed: May 6, 2016

(86) PCT No.: PCT/EP2016/060189
§ 371 (c)(1),
(2) Date: Mar. 1, 2018

(87) PCT Pub. No.: WO2017/036615
PCT Pub. Date: Mar. 9, 2017

(65) Prior Publication Data
US 2018/0253090 A1    Sep. 6, 2018

(30) Foreign Application Priority Data
Sep. 1, 2015  (DE) .................. 10 2015 114 605.3

(51) Int. Cl.
*G05B 23/00*   (2006.01)
*G05B 23/02*   (2006.01)

(52) U.S. Cl.
CPC ....... *G05B 23/0283* (2013.01); *G05B 23/024* (2013.01); *G05B 23/0275* (2013.01); *G05B 23/00* (2013.01)

(58) Field of Classification Search
CPC .............. G05B 23/0283; G05B 23/024; G05B 23/0275; G05B 23/00
See application file for complete search history.

(56) References Cited

U.S. PATENT DOCUMENTS

| 5,843,258 A | 12/1998 | Murakami |
| 6,264,577 B1 | 7/2001 | Hutchins |

(Continued)

FOREIGN PATENT DOCUMENTS

| AU | 2009203049 A1 | 2/2010 |
| CN | 1377056 A | 10/2002 |

(Continued)

OTHER PUBLICATIONS

Xiang et al., "An Intelligent Predictive Engine for Milling Machine Prognostic Monitoring", Industrial Informatics, 2006 IEEE International Conference on, pp. 1075-1080.

(Continued)

*Primary Examiner* — Gregory J Toatley, Jr.
*Assistant Examiner* — Lynda Dinh
(74) *Attorney, Agent, or Firm* — The Webb Law Firm

(57) ABSTRACT

Provided is a method for forecasting future operating states of machine components, which includes the respective machine component considered, a parameter that is selected that is representative of the state of the machine component, the parameter is recorded as a measured value during ongoing use of the machine component and, taking into account the use case for which the machine component is used, the measured value recorded is fed into an automatically running process for finding a recommendation for action. A system is also disclosed.

18 Claims, 2 Drawing Sheets

(56) References Cited

U.S. PATENT DOCUMENTS

| | | | |
|---|---|---|---|
| 6,591,157 | B1 | 7/2003 | Vivirito et al. |
| 6,944,572 | B2* | 9/2005 | Ushiku .................. F04B 49/065 |
| | | | 702/181 |
| 8,781,982 | B1* | 7/2014 | Das ........................ G06N 20/00 |
| | | | 706/21 |
| 9,360,393 | B2* | 6/2016 | Poon ........................ F03D 17/00 |
| 2003/0009311 | A1 | 1/2003 | Ushiku et al. |
| 2012/0101776 | A1* | 4/2012 | Brower .................. B64D 43/00 |
| | | | 702/183 |
| 2012/0143564 | A1* | 6/2012 | Li ...................... G05B 23/0283 |
| | | | 702/179 |
| 2012/0323371 | A1 | 12/2012 | Ballhausen |
| 2013/0151308 | A1* | 6/2013 | Helms .................. G06Q 10/087 |
| | | | 705/7.29 |
| 2013/0173202 | A1 | 7/2013 | Boerhout |
| 2015/0081230 | A1 | 3/2015 | Hamilton et al. |

FOREIGN PATENT DOCUMENTS

| | | |
|---|---|---|
| CN | 102402727 A | 4/2012 |
| CN | 104335022 A | 2/2015 |
| DE | 4444263 C1 | 5/1996 |
| DE | 102010002551 A1 | 9/2011 |
| DE | 102010045911 A1 | 3/2012 |
| DE | 202016008396 U1 | 11/2017 |
| EP | 1136201 A2 | 9/2001 |
| JP | 20097078 A | 1/2009 |

OTHER PUBLICATIONS

Applicant hereby submits for the record this Supplemental Information Disclosure Statement including the Office Action dated Jul. 23, 2020, which issued in corresponding Chinese Application No. 2016800506434.

Huang, Mechanical Manufacturing Technology, Aug. 2014, 12 pages, Beijing Institute of Technology Press.

* cited by examiner

METHOD FOR COMPUTER-ASSISTED FORECASTING OF FUTURE OPERATING STATES OF MACHINE COMPONENTS

CROSS-REFERENCE TO RELATED APPLICATIONS

This application is the United States national phase of International Application No. PCT/EP2016/060189 filed May 6, 2016, and claims priority to German Patent Application No. 10 2015 114 605.3 filed Sep. 1, 2015, the disclosures of which are hereby incorporated in their entirety by reference.

BACKGROUND OF THE INVENTION

The invention relates to a method enabling computer-assisted prediction of future states such as an imminent damage event, a maintenance requirement, the reaching of the maximum service life and the like.

"Machine components" are understood below to mean individual machine elements or groups of interacting machine elements that are combined to form specific aggregates. Each machine element considered is a smallest technical functional unit that is suitable for fulfilling the technically functional requirements arising from the respective technical use considered. Accordingly, the term "machine component" also includes the individual components used in the manufacture of machine components or their machine elements.

In many use cases, machine components of the type in question here are subject to high stresses of various kinds in practical use. The stresses may be the result of forces absorbed by the respective component or of environmental conditions (for example, ambient temperature, ambient atmosphere) under which the operation of the machine component takes place. The machine components subject to such stresses particularly include moving components such as wheels, rollers, rolls, shafts, rings, chains, belts, such as toothed belts, V-belts, flat belts or splined belts, which are used, for example, in drives, disks or disk profiles, seals, gear wheels, springs, as well as hoses, or assemblies that are themselves moved under stress or whose components move under stress in use, such as tooth systems, transmissions, drive units in general, particularly belt drives such as toothed belt drives, motors, clutches in general, particularly slipping clutches, clamping sets/shaft-hub connections, freewheels, roller bearings, slide bearings, brakes, drive trains and the like.

As a rule, each of these machine components is essential to the functioning of the machine in which it is used. As a result, a malfunction regularly occurs when the respective machine component is not working properly or even fails. The economic damage caused by such a malfunction can be considerable, especially in large-scale industrial production. Machine components therefore usually undergo regular maintenance and are replaced or repaired in a timely manner so as to minimise the risk of spontaneous failure. As a rule, the maintenance work follows a maintenance plan specified by the manufacturer of the machine or the machine component, taking into account empirical values, design criteria and operating conditions.

In the case of particularly critical machine components, it is also customary to systematically monitor specific parameters such as temperature development, the stresses absorbed and the like, in order to avoid overstressing the relevant components and premature failure. If the respectively monitored parameter reaches a specific limit value, this is usually interpreted as a warning signal upon which an action is triggered. This action may be, for example, to reduce the overstepping of the limit value in order to bring the monitored parameter back into its intended normal range, or to subject the relevant machine component to maintenance in order to prevent failure due to wear and thus guarantee that the component functions durably. The limit values that trigger the respective action when reached are usually based on empirical values that can be communicated either by the machine manufacturer to the machine operator or found by the machine operator on the basis of practical experience in the use of the machine.

The problem with this is that both the recording of the parameter(s) essential for the operating state of the respectively considered machine component and the determination of the respective limit value always require an interpretation of measured values and operating conditions. The result of this interpretation is either dependent on the experience of the machine operator or the machine supervisor, that is, the person who operates and supervises the machine, or on the quality of the empirical values and the interpretation model that the manufacturer of the respective machine component or machine equipped therewith takes as a basis for the recommendations for action that they give in case the monitored parameter reaches the limit value deemed critical.

SUMMARY OF THE INVENTION

The background of the procedure described above, which is customary in industrial practice, has given rise to the object of providing a method with which an event that is imminent in the life cycle of a machine component can be reproducibly predicted with a high degree of reliability.

Advantages of the invention are explained in detail below.

In some embodiments, the method according to the invention for computer-assisted forecasting of future operating states of machine components may include the following work steps:

A) For the respective machine component considered, at least one parameter is selected that is representative of the state of the machine component.
B) The parameter is recorded as a measured value during ongoing use of the machine component.
C) Taking into account the use case for which the machine component is used, the measured value recorded is fed into an automatically running process for finding a recommendation for action, the following procedure being taken as a basis:
   C.a) For the respective machine component considered, properties and the influence quantities determining said properties have been ascertained.
   C.b) For the respective machine component considered, the possible uses are determined, the influence quantities to which the machine component is subject during the respective use are ascertained, the resulting influence quantities formulated and it has been determined which influence quantities are correspondingly to be considered in the interpretation of the measured value recorded and the recommendation for action deduced from it.
   C.c) Statements obtained during the practical use of the machine component considered with respect to the influence quantities or statements pertaining to the influence quantities that are obtained through systematic experimental investigations are used to ascertain the interactions and effects of the influence quantities and associated with specific damage events.

Should it happen during ongoing use of the method that influence quantities and effects that are not yet identified exist, then these newly recognised influence quantities and effects are added to the group of influence quantities to be considered and interacting with others or associated with damage events.

If the product-specific or use-specific interactions can be described using a formula with a rule, this rule is formulated as soon as the interactions are known. Alternatively or additionally, the interactions can also be recorded in the form of fuzzy descriptions ("fuzzy logic", artificial neural networks, other methods of artificial intelligence) of the connections.

C.d) The information ascertained in work step C.c) relating to the interactions and the damage events influenced by them (influence quantities, rules, fuzzy descriptions of interactions) are fed as machine-readable data into a database. The database can comprise one, two or more individual databases, each containing machine-readable data relating to specific use cases and damage events coupled to them. Items of information ascertained on mutually influencing requirements and influence quantities are optionally linked to each other in the database in such a way that changes to one item of information have direct effects on the other item(s) of information linked to it. In the database, a network of items of information that are interrelated and linked to specific machine components is generated that is related to a plurality of different uses and damage events coupled to them.

C.e) The respective use, the measured value recorded and the assigned influence quantities are fed as input quantities into a selection algorithm running on a computer that, taking into account the input quantities and the measured value recorded, selects the recommendation for action that is optimally suitable for using in the respective use on the basis of the information stored in the database.

The measured value recorded is therefore interpreted using of the items of information, which are stored in the database, associated with each other and based on practical experience, thus giving a recommendation for action taking into account the peculiarities of the respective use case.

In this case, to derive a recommendation for action related to the respective use and taking into account the measured value recorded, the influence quantities arising in the relevant use have been formulated (work step C.b)).

For continuous improvement of the database created by work steps C.a) C.d) for the selection step (work step C.e)), the following work steps can be additionally completed:

C.f) The machine component for which the respective measured value considered is recorded and interpreted in the manner indicated in work step C.e). Is clearly identified with respect to the use case for which it is used.

C.g) For this purpose, the selected machine component is identified and monitored in its practical use by means of the identification means.

The identification means can not only carry information that clearly identifies the respective machine component but also information on the condition of the machine component in order to, for example, easily assign the measured values obtained by the monitoring to a specific property combination of the machine component considered.

In the simplest case, the monitoring provides, in addition to the measured value recorded, a statement regarding a further characteristic value, such as, for example, the duration that elapses between the start of the use and the recording of the respective measured value. In addition, the monitoring can also provide statements on two or more characteristic values, such as, for example, the external influences (temperature, atmosphere) to which the machine component has been subject in use. The identification means can also even be equipped in such a way that it provides statements regarding the internal state and the stresses on the machine element during operation. It is, of course, also possible to use other measuring methods that are known per se in order to detect the forces prevailing in the machine element during use, its changes in length, temperature development and the like (in this regard, for the example of a belt drive see U.S. Pat. No. 6,264,577 B1, DE 10 2010 002 551 A1, JP 2009-007078 A, DE 44 44 263 C1, U.S. Pat. No. 5,843,258 A, AU 2009203049 A1).

C.h) The statements collected in work step C.g) are fed as influence quantities into the process starting with work step C.c).

A self-learning, constantly improving selection system that illustrates the practical reality more and more realistically is created with work steps, C.f) to C.h) which are optionally performed in addition. Of course, not every machine component selected must undergo the additional work steps C.f) to C.h), but it may be sufficient if at least one machine component, optimally a representative number of machine components in the respective use, is monitored.

German patent application 10 2015 107 176.2 is incorporated by reference into the present application.

In some embodiments, the invention provides the possibility of ascertaining, based on a measured value recorded for a specific machine component, a recommendation for action that takes into account the influence quantities typical for the respective use and systematically linked to each other.

In this way, embodiments of the invention makes it possible, starting from the measured value respectively recorded and on the basis of the influence quantities ascertained for the respective use case and through systematic test series or by acquiring practical experience, and their relationships, to produce an accurate, automatically generated forecast of the position of the respective machine component considered in its life cycle.

As a consequence, the recommendation for action resulting from this forecast reflects, with high accuracy, the actual action required. Thus, the recommendation for action ascertained according to embodiments of the invention for maintenance to be carried out within a specific period of time with the aim of maintaining the normal state of the machine component, can consist in the recommendation for a replacement to take place by a certain specified time in order to prevent spontaneous failure expected with a high degree of certainty after that time, or in waiting if the measured value recorded has proved not critical, that is, providing evidence of a normal state.

Since the recommendation for action ascertained according to embodiments of the invention is delivered at a time when no damage event has yet occurred, the procedure according to the invention allows for high planning security. Maintenance work or the replacement of a machine component can then be performed at a time when downtime is planned for the respective machine, such as on a weekend or during maintenance work routinely scheduled for other reasons.

For the assignment of the influence quantities or the measured value recorded to specific uses of the machine components, a so-called "use key" can be defined that is applied in a standardised form and couples assigned influence quantities to each other. The machine processing of the process for identifying the respectively suitable recommendation for action can be simplified by such a use key.

According to embodiments of the invention, the machine element that is optimally suitable for the respective use is accurately determined in an automated process based on empirically ascertained or theoretically formulated information stored in a database, on the basis of the respective use. The information used for this purpose and stored in the database describes the relationships existing between the respective use, the influence quantities applicable to it and their interactions, and its quality and meaningfulness can be continuously improved in the sense of a self-learning system by repeated inputting of newly acquired information.

In some embodiments, a system according to the invention can be designed so that, in the case of new uses for which there is not yet any directly assigned information in the database, it determines the closest use and makes a proposal for a machine element to be used on the basis of this closest use, for example by means of the influence quantities assigned to this new use and the interactions ascertained or formulated from the information stored in the database. In this way, an optimally suitable machine element can also be quickly determined in an iterative process for a new use without the need to perform complex, time-consuming tests for that purpose.

Advantages of embodiments of the invention may include:
- a detailed, use-specific consideration and dimensioning of the design according to any criteria,
- an optimal utilisation of the product and material properties inherent to the respective machine element considered and the resulting actual life expectancy, taking into account the particularities of the respective use case,
- the targeted avoidance of too early or too late replacement of the machine element and a concomitant optimal utilisation of the resource that the respective machine element constitutes,
- the avoidance of uncontrolled failures that can be caused in the prior art by the selection of machine elements that prove adequate according to the selection criteria previously considered but in practice prove unsuitable, or by unrecognised interactions of influence quantities,
- the continuous improvement of the prediction of more use-specific questions, and
- the targeted, economical product development for special problems, the specific advantage of the procedure according to the invention here being that not only can individual parts or assemblies be taken into account as machine components in the selection, but the result of the approach according to the invention, when determining the optimised component for the respective use, can also be proposals for the selection of specific parts, materials or method parameters by means of which a machine element or an assembly ("aggregate") formed from a plurality of interacting machine elements can be produced that is optimally adapted to the requirements arising from the intended use.

Use-related influence quantities can be
- mechanical stresses (rotational speed, torque, pre-tensioning forces, drive geometry, friction pairing, load change, load cycles, velocities, accelerations, tensile or compressive stresses, other dynamic or static stresses),
- environmental conditions (atmosphere in which the use takes place, ambient humidity and temperature, contamination, material combination, pressure),
- properties of the material of which the machine component is made (material behaviour during heating, under load, with load changes, with friction),
- geometric shape and quality of the machine component.

The measurement result recorded on the respectively monitored machine component can be transmitted using all conceivable devices for data transmission to a central computer system in which the information used according to embodiments of the invention is stored and the respective interpretation of the measured value is performed. The central computer system then returns, likewise via a suitable data transmission device, the recommendation for action ascertained from the measured value to the machine operator or automatically initiates the steps resulting therefrom.

DESCRIPTION OF THE INVENTION

Figure 2:
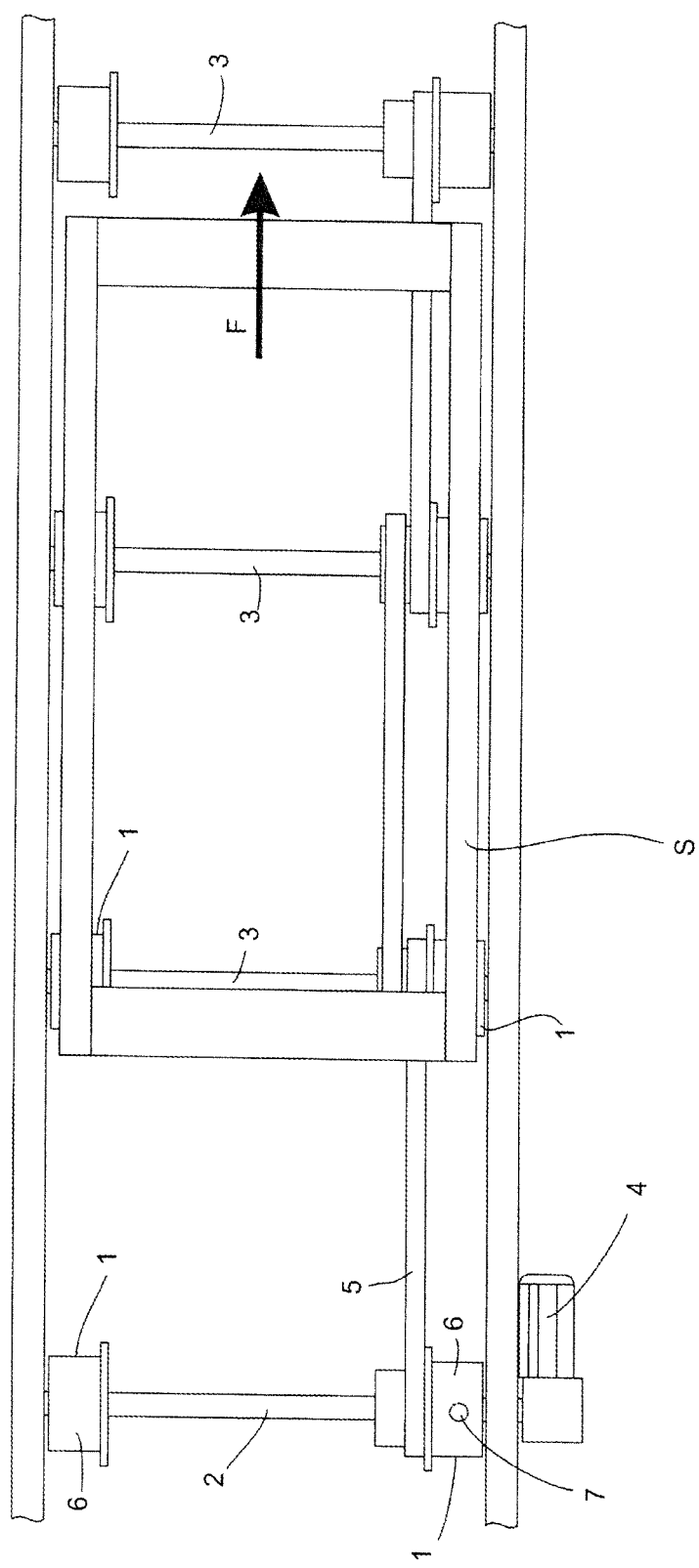
FIG. 2 is a plan view of a conveyor system implementing an embodiment of the present invention.

An exemplary embodiment that is typical for the invention is described below:

For this purpose, FIG. 2 shows a conveyor F in plan view.

In modern car production, the respective assemblies, the body or the already partially assembled vehicle are transported on carriages via conveyor belts. The carriages S of such conveyors F, which are also referred to in practice as "SKID systems", run over rollers 1 that are mounted on shafts 2, 3.

A shaft 2 is driven by an electric motor 4, while the other shafts 3 are coupled to the driven first shaft 2 via a belt drive 5.

The rollers 1 bear on their circumference a coating 6 made of a polyurethane material ("PU material") or another elastomer. The coating 6 accordingly has, on the one hand, a certain elasticity, and on the other hand, a high friction in order to ensure safe and sufficiently damped coupling of the carriage to be driven forward (http://www.logsystems.de/skid.html).

The rollers 1 of SKID systems are subject to high stresses and accordingly high wear. At the same time, the unforeseen failure of such a roller 1 can bring an entire production line to a standstill. To avoid this, the rollers 1 are replaced at regular, predefined intervals in conventional SKID systems.

In a skid system F according to the invention, at least one of the rollers 1 is equipped with a sensor 7 that detects the temperature development in the PU coating 6 of the roller 1.

In the course of the method according to the invention, the known use cases are recorded in which, for example, the rollers 1 considered here by way of example are used. To this end, customer data, use cases and used products, production conditions, operating conditions and so on are recorded in detail in a use key. On suitable test stands, the use scenario typical for the respective use case is then simulated and, for this specific use, service life tests, for example, are carried out. The findings obtained from the practical customer experiences or using the test results become parts of the pool of interrelated items of information stored in the database.

This information reflects the service life expected under the respective operating conditions as well as the operating behaviour of the rollers 1 expected in the "SKID system" and correlates this, for example, with the temperature development in the PU material of the PU coating 6 of the roller 1.

The sensor 7 sends the measured values it has recorded to a central data processing system, not shown here, in which the evaluation of the measured values is performed and a recommendation for action is derived from this evaluation, on the basis of which, where appropriate, a replacement or general maintenance of the roller 1 is subsequently performed.

Accordingly, the temperature of the PU coating 6 measured by the sensor 7 normally lies within a specific normal temperature range. As the service life increases, the rolling behaviour of the carriages S on the rollers 1 changes as a result of various influence quantities, such as ageing of the coating, material fluctuations or fatigue, geometric errors in the orientation of the individual components relative to each other, such as alignment errors, changes in the state of the circumferential surface of the rollers 1 coming into contact with the carriages S as a result of damage or abrasion. Wear and flexing increase, causing the temperature in the coating 6 to also increase. Accordingly, the temperature measured by the sensor 7 rises.

Figure 1:
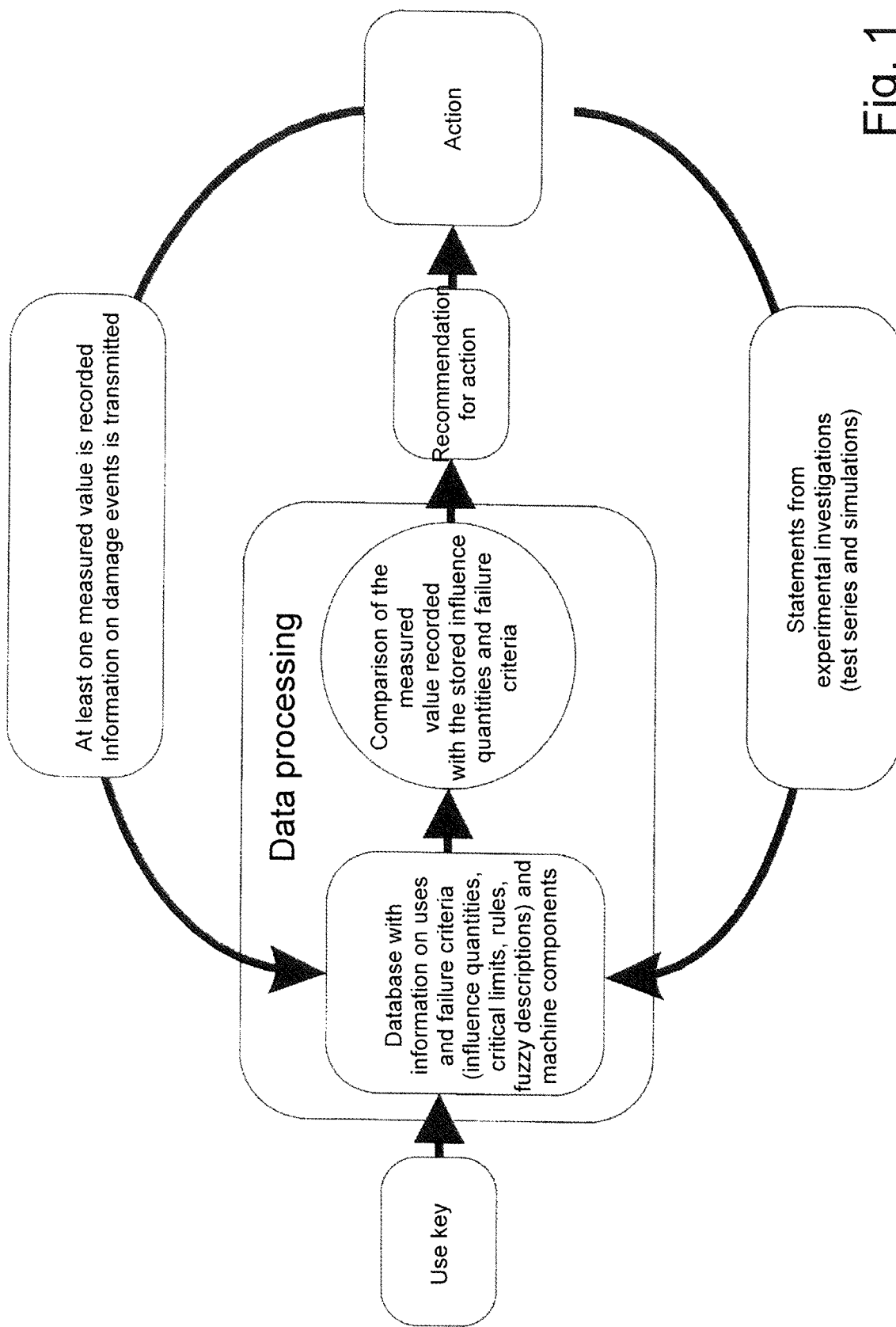
FIG. 1 is a process flow diagram of a process according to an embodiment of the present invention.

The temperature recorded by the sensor 7 is fed as an input quantity into the interpretation system running on the data processing device and shown in FIG. 1, and compared with the findings stored there regarding the influence quantities that are significant in the use case "SKID system" and with the correlated temperature development of the coating 6 of the roller 1. If this interpretation implies, for example, that the temperature rise is progressing at a rate deviating from than that of a standard course, which is indicative of complete failure, that is, the service life limit is reached within in a specific, near-term period, the system recommends replacing the roller 1 at a safe interval before the relevant period is reached. However, if the temperature recorded shows that the temperature development is attributable, for example, to the seasonal rise in the ambient temperature or the like, the recommendation for action "normal operation" is issued, meaning no required action is indicated.

The temperature profile recorded by the sensor 7 and any further information that is available on the operating conditions under which the rollers 1 are used, are compared with the information stored in the interpretation system. By sampling, the actual state of wear of the respectively replaced roller 1 can be checked.

If there proves to be a significant deviation of the forecast state from the actual state, the temperature profile recorded and the further information assigned to it regarding the operating conditions are incorporated into the database underlying the interpretation system and the information stored there on influence quantities and rules on the coupling and mutual influence of these factors are updated accordingly.

Likewise, information regarding unforeseen damage events that were not predicted or not correctly predicted by the interpretation system is fed into the system and used to improve the rules and influence qualities stored there.

The interpretation system is thus constantly improved, meaning that the target safety of the forecasting results leading to the respective recommendations for action is also continuously improved.

The invention claimed is:

1. A system for computer-assisted forecasting of future operating states of machine components, comprising one or more databases, one or more sensors, and a computer having a processor, the computer including instructions that, when executed, performs the following steps:
   A) obtaining a selected parameter for a machine component that is representative of an operating state of the machine component;
   B) measuring a value of the parameter selected in step A) via the one or more sensors during the operating state of the machine component;
   C) recording the value measured in step B) during ongoing operating state of the machine component; and
   D) feeding the value measured in step B) to a process for finding a recommendation for action, wherein the process comprises:
      D.a) obtaining, the measured value of the machine component and influence quantities that are applicable to the operating state of the machine component as input quantities, wherein the influence quantities comprise one or more of: mechanical stresses, environmental conditions, properties of a material of the machine component, a geometric shape of the machine component and machine component quality; and
      D.b) providing an action recommendation based on the input quantities wherein providing the action recommendation comprises:
         D.b.i) feeding, the input quantities into a selection algorithm running on the computer,
         D.b.ii) comparing, by the selection algorithm of the computer, the input quantities with information stored in the one or more databases, wherein the information relates to interactions and effects of the influence quantities and specific damage events associated therewith, and wherein the information stored in the one or more databases is based on i) information collected through monitoring one or more machine components during one or more operating states or ii) information collected through systematic experimental investigations; and
         D.b.iii) providing a message a) recommending the machine component should be replaced or maintenance of the machine component should be performed if the comparison in step D.b.ii) is indicative that a service life limit of the machine has been reached or will be reached in a near-term period or b) indicating no current action is required for the machine component;
      D.c) accessing the recorded value associated with the operating state of the machine component; and
      D.d) storing information relating to the recorded value associated with the operating state of the machine component into the one or more databases.

2. The system according to claim 1, wherein the feeding according to step D.b.i) further comprises new influence quantities into the algorithm, wherein the new influence quantities were previously unidentified, and associating the new influence quantities with interactions and effects of other influence quantities and damage events.

3. The system according to claim 1, wherein the one or more databases comprises two or more individual databases, each containing machine-readable data relating to specific operating states of the machine component.

4. The system according to claim 1, wherein a representative number of machine components is monitored during the operating state.

5. The system according to claim 1, further comprising associating the measured value with a machine component condition and feeding the condition into the selection algorithm as the influence quantity and storing said condition in the one or more databases.

6. The system according to claim 1, further comprising recording an amount of time that elapses between start of the operating state of the machine component and a time at which point a replacement becomes necessary due to wear.

7. The system according to claim 1, wherein two or more characteristic values of the machine component are monitored by the one or more sensors.

8. The system according to claim 1, further comprising measuring one or more values of the selected parameter of the machine component obtained by the one or more sensors, and monitoring internal state and stresses of the machine component during the operating state.

9. The system according to claim 1, wherein the machine component is or comprises a belt for belt drives.

10. A method for computer-assisted forecasting of future operating states of machine components, comprising the following steps:
   A) selecting a parameter for a machine component that is representative of an operating state of the machine component;
   B) measuring a value of the parameter selected in step A) via one or more sensors positioned on or adjacent to the machine component during the operating state of the machine component;
   C) recording the value measured in step B) during ongoing operating state of the machine component; and
   D) feeding the value measured in step B) to a process running on a computer having a processor for finding a recommendation for action, wherein the process comprises:
      D.a) obtaining, via the processor, the measured value of the machine component and influence quantities that are applicable to the operating state of the machine component as input quantities, wherein the influence quantities comprise one or more of: mechanical stresses, environmental conditions, properties of a material of the machine component, a geometric shape of the machine component and machine component quality; and
      D.b) providing an action recommendation based on the input quantities wherein providing the action recommendation comprises:
         D.b.i) feeding, via the processor, the input quantities into a selection algorithm running on the computer,
         D.b.ii) comparing, by the selection algorithm of the computer, the input quantities with information stored in a database, wherein the information relates to interactions and effects of the influence quantities and specific damage events associated therewith, and wherein the information stored in the database is based on i) information collected through monitoring one or more machine components during one or more operating states or ii) information collected through systematic experimental investigations; and
         D.b.iii) providing a message a) recommending the machine component should be replaced or maintenance of the machine component should be performed if the comparison in step D.b.ii) is indicative that a service life limit of the machine has been reached or will be reached in a near-term period or b) indicating no current action is required for the machine component;
      D.c) accessing in the database, via the processor the recorded value associated with the operating state of the machine component; and
      D.d) storing information relating to the recorded value associated with the operating state of the machine component into the database.

11. The method according to claim 10, wherein the feeding according to step D.b.i) further comprises new influence quantities into the algorithm, wherein the new influence quantities were previously unidentified, and associating the new influence quantities with interactions and effects of other influence quantities and damage events.

12. The method according to claim 10, comprising two or more individual databases, each containing machine-readable data relating to specific operating states of the machine component.

13. The method according to claim 10, wherein a representative number of machine components is monitored during the operating state.

14. The method according to claim 10, further comprising associating the measured value with a machine component condition and feeding the condition into the selection algorithm as the influence quantity and storing said condition in the database.

15. The method according to claim 10, further comprising recording an amount of time that elapses between start of the operating state of the machine component and a time at which point a replacement becomes necessary due to wear.

16. The method according to claim 10, wherein two or more characteristic values of the machine component are monitored by the one or more sensors.

17. The method according to claim 10, further comprising measuring one or more values of the selected parameter of the machine component obtained by the one or more sensors, and monitoring internal state and stresses of the machine component during the operating state.

18. The method according to claim 10, wherein the machine component is or comprises a belt for belt drives.

* * * * *